(12) United States Patent
Talamonti et al.

(10) Patent No.: US 9,333,887 B2
(45) Date of Patent: May 10, 2016

(54) POWER ARTICULATING HEADREST ASSEMBLY

(71) Applicant: Ford Global Technologies, LLC, Dearborn, MI (US)

(72) Inventors: Joseph S. Talamonti, Canton, MI (US); Mandeep Singh Sidhu, Canton, MI (US); Yalie Yan-rush, Plymouth, MI (US); Steven Carnago, Macomb, MI (US); Marcos Silva Kondrad, Macomb, MI (US); Johnathan Andrew Line, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/315,443

(22) Filed: Jun. 26, 2014

(65) Prior Publication Data

US 2015/0375650 A1    Dec. 31, 2015

(51) Int. Cl.
*B60N 2/48* (2006.01)
*B60N 2/22* (2006.01)

(52) U.S. Cl.
CPC ............ *B60N 2/4864* (2013.01); *B60N 2/22* (2013.01); *B60N 2/2222* (2013.01); *B60N 2/485* (2013.01); *B60N 2/4838* (2013.01); *B60N 2/4852* (2013.01)

(58) Field of Classification Search
CPC .... B60N 2/4852; B60N 2/4838; B60N 2/485; B60N 2/4855; B60N 2/4847; B60N 2/2222; B60N 2/22
USPC ................... 297/408, 409, 410, 61
See application file for complete search history.

(56) References Cited

U.S. PATENT DOCUMENTS

| | | | |
|---|---|---|---|
| 3,885,831 A | 5/1975 | Rasmussen | |
| 4,511,180 A * | 4/1985 | Klaus | B60N 2/4885 297/391 |
| 4,536,027 A * | 8/1985 | Brennan | A47C 7/70 244/122 R |
| 4,576,411 A * | 3/1986 | Kitamura | B60N 2/38 16/332 |
| 4,576,413 A * | 3/1986 | Hatta | B60N 2/487 297/391 |
| 4,623,166 A * | 11/1986 | Andres | B60N 2/487 280/751 |
| 4,640,549 A * | 2/1987 | Yokota | B60N 2/4808 297/356 |
| 4,807,934 A * | 2/1989 | Sakakibara | B60N 2/4829 297/403 |
| 5,222,784 A | 6/1993 | Hamelin | |
| 5,590,933 A * | 1/1997 | Andersson | B60N 2/487 297/403 |
| 5,681,079 A | 10/1997 | Robinson | |
| 5,795,023 A | 8/1998 | Kayumi | |
| 5,826,942 A | 10/1998 | Sutton et al. | |
| 6,000,760 A * | 12/1999 | Chung | B60N 2/4805 297/408 |
| 6,007,154 A | 12/1999 | Parker et al. | |
| 6,045,181 A * | 4/2000 | Ikeda | B60N 2/4847 297/216.12 |
| 6,375,264 B1 * | 4/2002 | Kienzle | B60N 2/4858 297/403 |
| 6,511,130 B2 * | 1/2003 | Dinkel | B60N 2/4808 297/408 |
| 6,655,702 B2 * | 12/2003 | Senger | B60N 2/01541 280/30 |

(Continued)

*Primary Examiner* — Joshua J Michener
*Assistant Examiner* — Matthew Gitlin
(74) *Attorney, Agent, or Firm* — Vichit Chea; Price Heneveld LLP

(57) ABSTRACT

A vehicle headrest assembly includes a headrest member operably coupled to a seatback. The headrest member is moveable between upright and folded positions relative to the seatback. A support assembly includes first and second linkages which are pivotally coupled to the headrest member and the seatback at opposite ends thereof. First and second latch brackets are coupled to the first and second linkages respectively and operable between latched and unlatched positions for moving the headrest member to the folded position from the upright position when the latch brackets are in the unlatched position.

17 Claims, 12 Drawing Sheets

(56) References Cited

U.S. PATENT DOCUMENTS

| | | | |
|---|---|---|---|
| 6,899,395 B2 | 5/2005 | Yetukuri et al. | |
| 6,962,392 B2 | 11/2005 | O'Connor | |
| 7,111,901 B2 | 9/2006 | Schlierf et al. | |
| 7,172,254 B2 * | 2/2007 | Steinle | B60N 2/4835 297/409 |
| 7,413,253 B2 | 8/2008 | Karlberg | |
| 7,455,363 B2 * | 11/2008 | Chung | B60N 2/4808 297/391 |
| 7,543,891 B2 | 6/2009 | Chung | |
| 7,640,090 B2 | 12/2009 | Uchida et al. | |
| 7,681,955 B2 * | 3/2010 | Seo | B60N 2/4844 297/403 |
| 7,794,012 B2 | 9/2010 | Szablewski | |
| 7,871,129 B2 | 1/2011 | Boes et al. | |
| 7,988,234 B2 | 8/2011 | Kim et al. | |
| 8,075,051 B2 * | 12/2011 | Vitali | B60N 2/4808 297/216.12 |
| 8,109,569 B2 | 2/2012 | Mitchell | |
| 8,157,328 B2 | 4/2012 | Brunner et al. | |
| 8,172,329 B2 * | 5/2012 | Kim | B60N 2/4829 297/408 |
| 8,201,883 B2 | 6/2012 | Wuerstlein et al. | |
| 8,226,170 B2 * | 7/2012 | Lutzka | B60N 2/3009 297/403 |
| 8,348,338 B2 | 1/2013 | Galecka et al. | |
| 8,348,347 B2 | 1/2013 | Willard et al. | |
| 8,382,206 B2 * | 2/2013 | Grable | B60N 2/4847 297/408 |
| 8,459,731 B2 | 6/2013 | Runde | |
| 8,616,650 B2 | 12/2013 | Markel et al. | |
| 8,662,591 B2 * | 3/2014 | Lin | A47C 7/38 297/391 |
| 8,801,103 B2 * | 8/2014 | Bittinger | B60N 2/487 297/391 |
| 2002/0024247 A1 * | 2/2002 | Mori | B60N 2/0224 297/391 |
| 2004/0090056 A1 * | 5/2004 | Sung | B60N 2/4858 280/751 |
| 2005/0062330 A1 * | 3/2005 | Eberle | B60N 2/4228 297/408 |
| 2007/0085401 A1 * | 4/2007 | Hunziker | A61G 5/12 297/410 |
| 2007/0246989 A1 * | 10/2007 | Brockman | B60N 2/4864 297/391 |
| 2010/0140992 A1 | 6/2010 | Yamaguchi | |
| 2012/0041648 A1 | 2/2012 | Yamaguchi et al. | |

* cited by examiner

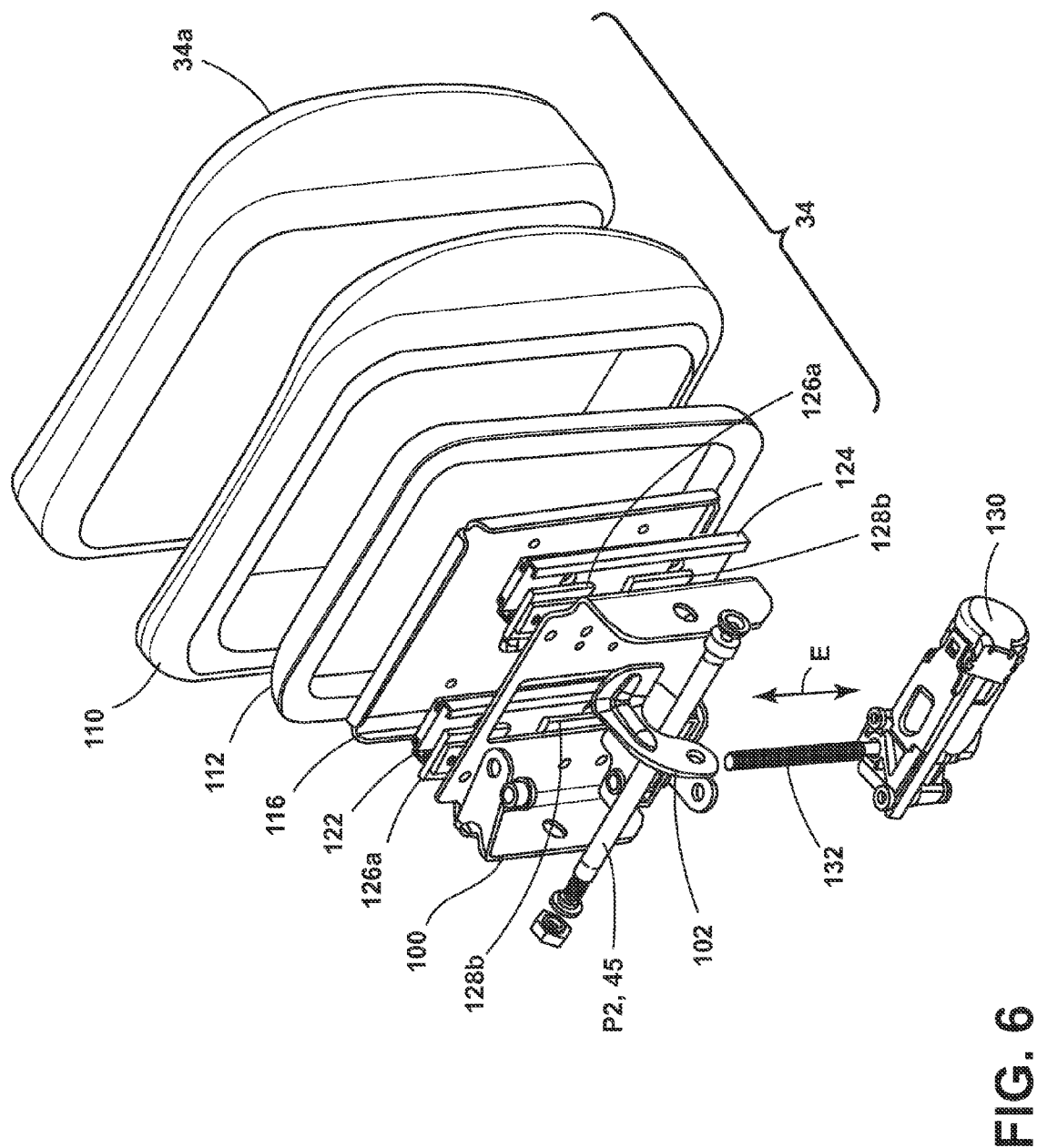

POWER ARTICULATING HEADREST ASSEMBLY

FIELD OF THE INVENTION

The present invention generally relates to a vehicle headrest, and more particularly to a vehicle seating assembly having an articulating headrest assembly.

BACKGROUND OF THE INVENTION

It is common for front seating assemblies in vehicles to include a headrest assembly for supporting the head of a seated occupant. Generally, these headrest assemblies are installed separately on a vehicle seat in a vehicle manufacturing facility after the vehicle seat has been installed in a vehicle interior. This is generally due to the fact that when assembled, the vehicle seat in combination with the headrest assembly is too large to fit through the front driver's side or passenger's side doors. Further, an assembled seat with headrest is often too large to ship as a unitary structure on a typical trailer storage shelf. Thus, they are typically installed separately which incurs higher costs and a number of undesired installment executions. Further, making electrical and structural connections between the vehicle seat and the headrest assembly is an assembly execution that is better performed when the vehicle seat is not installed in the vehicle. Further still, known headrest assemblies may be limited to vertical adjustment relative to a seatback, such that these headrest assemblies lack adequate adjustment features for different sized occupants and various positions a seated occupant may assume in the vehicle seat.

SUMMARY OF THE INVENTION

One aspect of the present invention includes a vehicle headrest assembly including a headrest member which is operably coupled to a seatback between upright and folded positions. A support assembly includes first and second linkages which are pivotally coupled to the headrest member and seatback at opposite ends thereof. First and second latch brackets are coupled to the first and second linkages respectively and are operable between latched and unlatched positions. The headrest member is moveable to the folded position from the upright position when the first and second latch brackets are in the unlatched position.

Another aspect of the present invention includes a vehicle headrest assembly having a support assembly defined by first and second linkages which are pivotally coupled to a headrest member between fore and aft positions. The headrest member is vertically adjustable. First and second latch brackets are coupled to the first and second linkages respectively and are operable between latched and unlatched positions. The headrest member is moveable to a folded position when the latch brackets are in the unlatched positions.

Yet another aspect of the present invention includes a vehicle headrest assembly having a headrest member coupled to a headrest bracket. A seatback includes a cross member with a first actuator member disposed thereon. A first linkage is pivotally coupled to the cross member at a first end and pivotally coupled to the headrest bracket at a second end. The first linkage includes a support arm extending outwardly therefrom. A first latch bracket is coupled to the first actuator at a lower end and further coupled to the support arm at an upper end. A second linkage is coupled to a second latch bracket at a first end and pivotally coupled to the headrest bracket at a second end. The second latch bracket is disposed on the cross member. The first and second linkages define a support assembly which is moveable between fore and aft positions as powered by the first actuator. The first and second latch brackets are operable between latched and unlatched positions, wherein the headrest member is moveable to a folded position when the first and second latch brackets are in the unlatched position.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 6 is an exploded rear, top perspective view of a motorized actuation assembly of the headrest assembly;

DETAILED DESCRIPTION OF THE PREFERRED EMBODIMENTS

Figure 1:
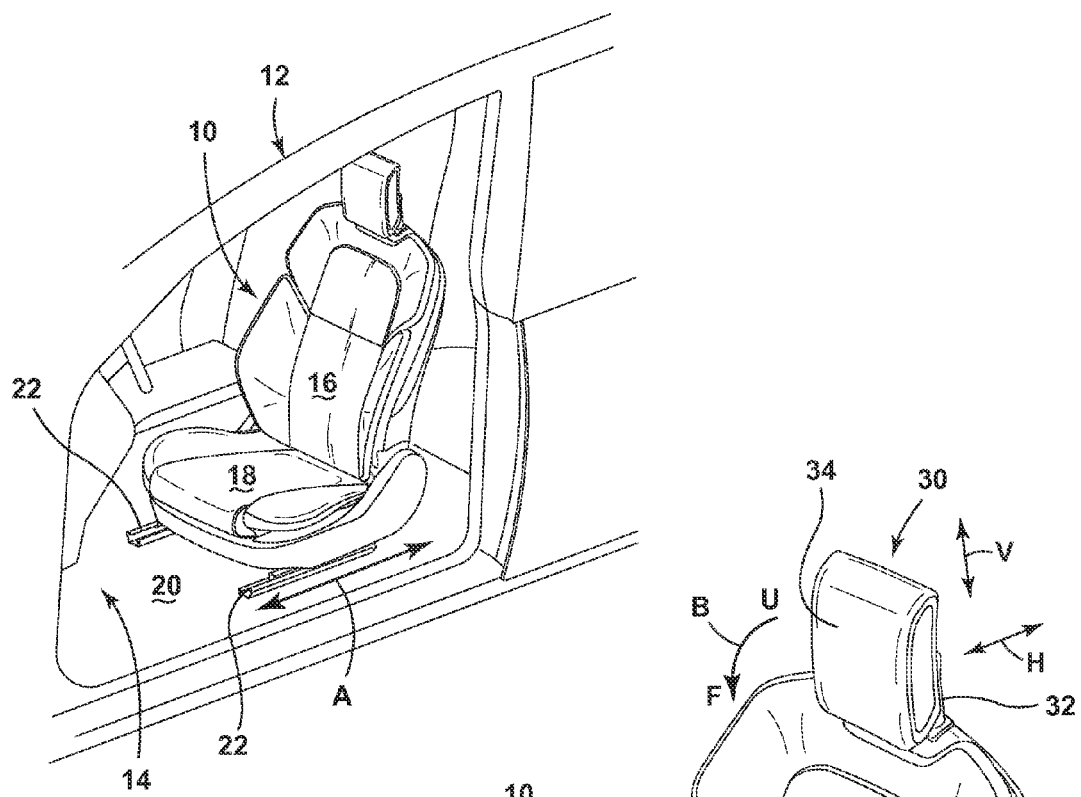
FIG. 1 is a top perspective view of a vehicle seat having a headrest assembly installed in a vehicle interior according to one embodiment.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, the reference numeral 10 generally designates a vehicle seat as positioned within a vehicle interior 14 of a vehicle 12 on a driver's side thereof. The vehicle seat 10 includes a seatback 16 pivotally coupled to a seat member 18. The seat member 18 is slidably coupled to a vehicle floor 20 along a track assembly 22. The track assembly 22 is configured to allow the vehicle seat 10 to be adjusted in forward and rearward directions along a path indicated by arrow A within the vehicle interior 14. It is understood that the vehicle seat 10 may be positioned in various locations throughout the vehicle interior 14 other than the illustrated position, such as a passenger's side location, a mid-row location, and a rear seat location. It is also conceivable that the seat member 18 may not include a track assembly, like track assembly 22, and alternatively may be fixedly coupled to the vehicle floor 20.

Figure 2:
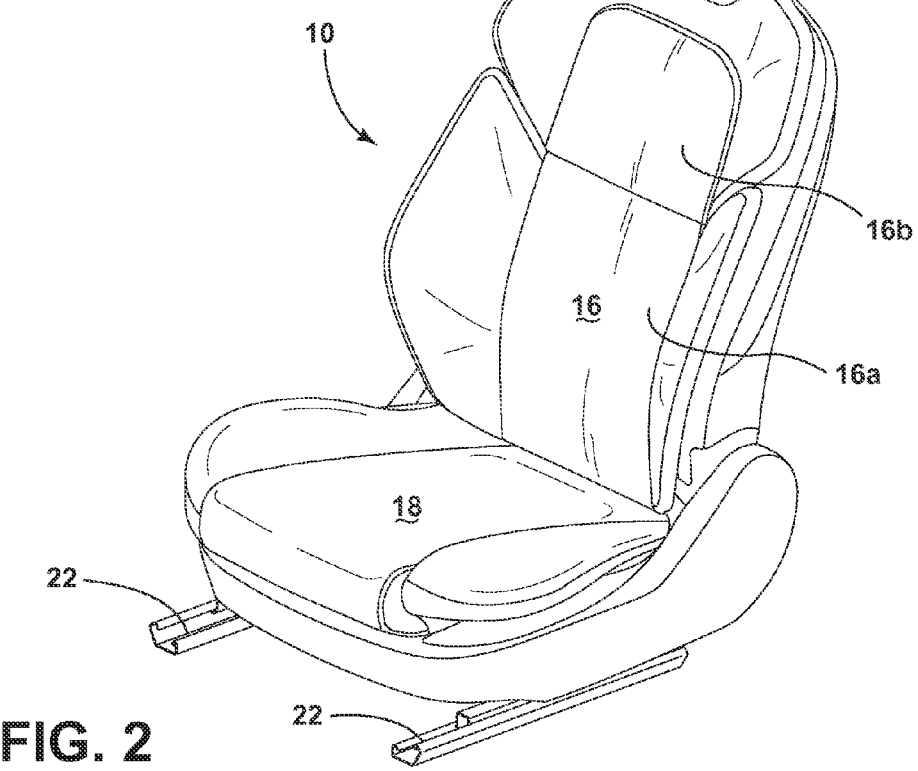
FIG. 2 is a top perspective view of the vehicle seat of FIG. 1 removed from the vehicle interior.

Referring now to FIG. 2, the seatback 16 includes a lower portion 16a and an upper portion 16b. The upper portion 16b of the seatback 16 is coupled to a headrest assembly 30 by a support assembly 32. The headrest assembly 30 includes a headrest member 34, shown in FIG. 2 in a fully upright position U above the seatback 16, which is vertically and horizontally adjustable along paths indicated by arrows V and H respectively. The headrest assembly 30 is further configured to move the headrest member 34 from the upright position U to a folded position F long a path indicated by arrow B as further described below with reference to FIGS. 4B-4D.

Figure 3:
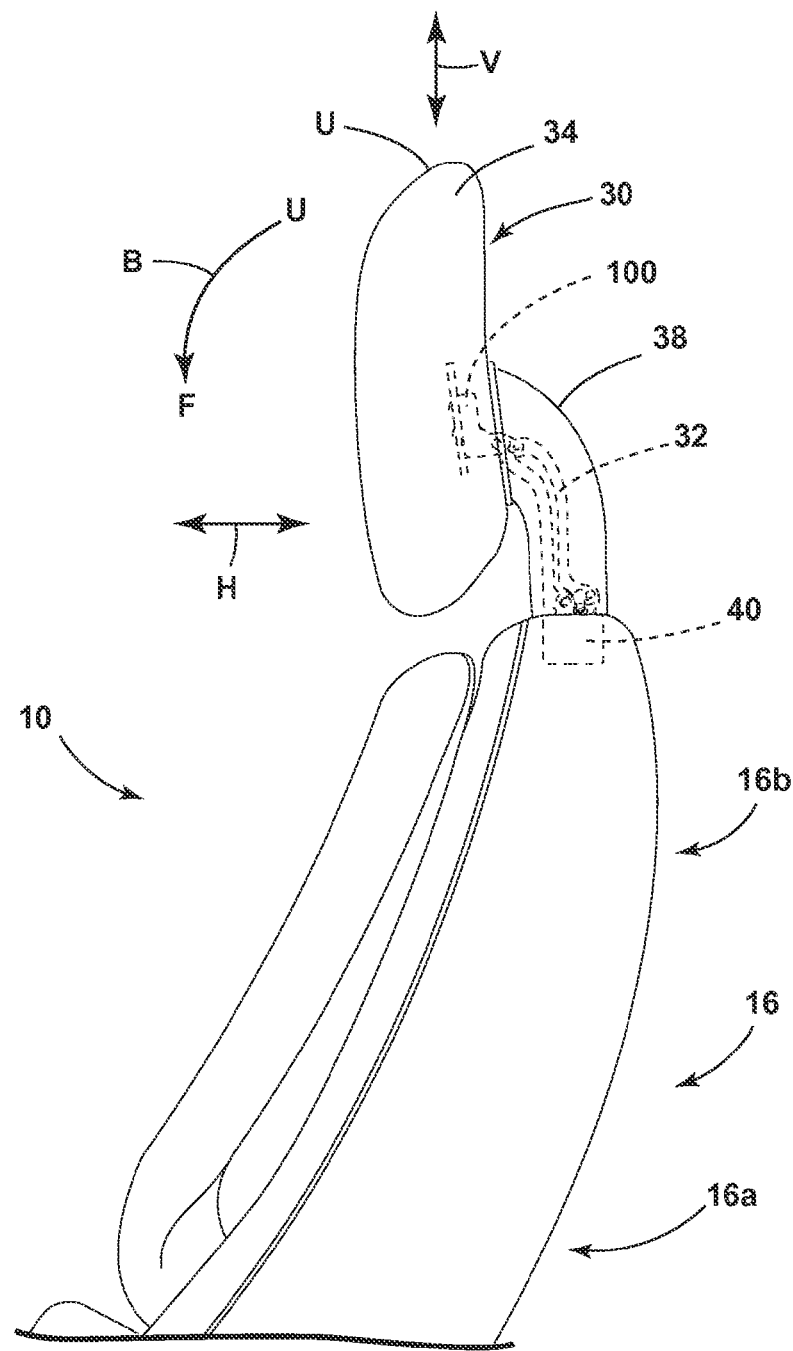
FIG. 3 is a side elevational view of the headrest assembly and a portion of a seatback of the vehicle seat of FIG. 1.

Referring now to FIG. 3, the support assembly 32 of the headrest assembly 30 extends upwardly from the upper portion 16b of the seatback 16 and curves slightly forward to couple with a headrest bracket 100 of the headrest member 34 as further described below. As shown, the support assembly 32 includes the trim piece 38 that substantially encloses components of the support assembly 32 as further described below. The trim piece 38 extends from the headrest member 34 to the upper portion 16b of the seatback 16. It is conceivable that the trim piece 38 may include flexible components such as vinyl or leather structures to accommodate for relative movement of the headrest member 34 and support assembly 32. As shown in FIG. 3, the support assembly 32 is pivotally coupled to a cross member 40 disposed in the upper portion 16b of the seatback 16 for structurally support the headrest assembly 30.

Figure 4A:
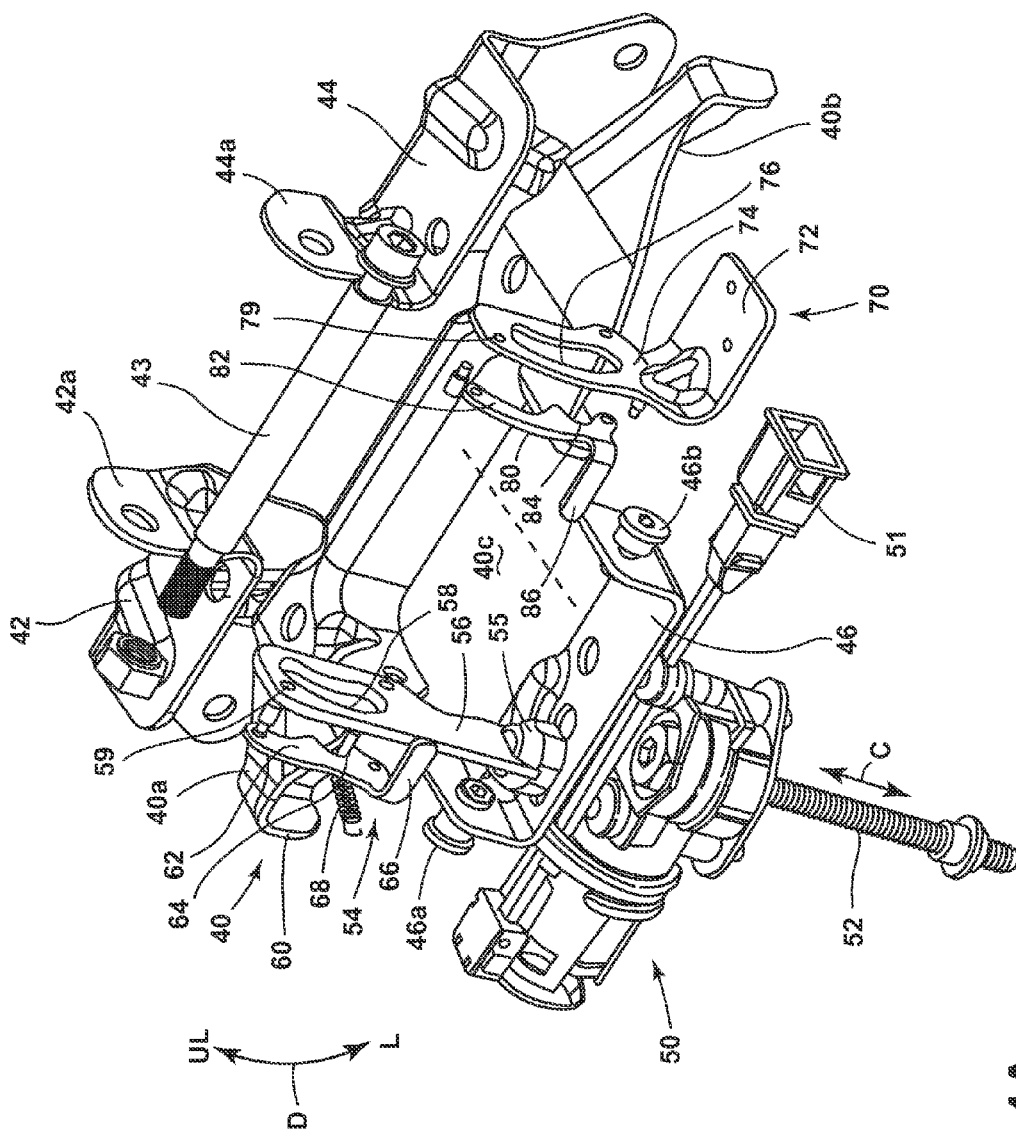
FIG. 4A is an exploded rear perspective view of components of the headrest assembly exploded away from structural elements in the seatback.

Referring now to FIG. 4A, the cross member 40 is shown having first and second ends 40a, 40b, with a middle portion 40c disposed therebetween. Support brackets 42, 44 are configured to couple to the cross member 40 at the first and second ends 40a, 40b, respectively. The support brackets 42, 44 include upright connecting portions 42a, 44a which are configured to receive a pivot bar 43 which pivotally connects a linkage of the support assembly 32 as further described below. An attachment bracket 46 includes fasteners 46a, 46b for coupling to the cross member 40 at the middle portion 40c. The attachment bracket 46 is coupled to a first actuator 50 which includes a drive shaft 52 for driving the fore and aft positioning of the headrest member 34 along a path as indicated by arrow H in FIG. 3. The first actuator 50 is configured to drive the drive shaft 52 in a vertical direction along a path as indicated by arrow C. A power connector 51 is used to connect the first actuator 50 to a power source for remote adjustment of the headrest assembly 30. As shown in FIG. 4A, a first latch bracket 54 is configured to connect to the drive shaft 52 of the first actuator 50, for vertical movement therewith, at threaded connector 55. The first latch bracket 54 includes a body portion 56 extending upwardly from threaded connector 55, and also includes a slot 58 disposed through the body portion 56. The slot 58 is a generally curved slot, or "banana slot", that is configured to guide movement of the support assembly 32 (FIG. 3) as the headrest member 34 moves from the upright position U to the folded position F along the path indicated by arrow B in FIG. 3. The first latch bracket 54 further includes a latch member 60 having a body portion 62 with an engagement notch 64 disposed thereon. Extending orthogonally from the body portion 62 of the latch member 60, a handle portion 66 is disposed for engagement by a user to move the latch member 60 between latched and unlatched positions L, UL along a path as indicated by arrow D. The latch member 60 is pivotally coupled to the body portion 56 of the first latch bracket 54 at attachment location 59. The latch member 60 is further coupled to the body portion 56 via a biasing mechanism 68 which biases the latch member 60 towards the latched position L.

As further shown in FIG. 4A, a second latch bracket 70 is configured to couple to the second end 40b of the cross member 40. The second latch bracket 70 includes a connecting portion 72 and an orthogonally upright extending body portion 74. In assembly, the connecting portion 72 is used to couple the second latch bracket 70 to the cross member 40 at second side 40b. The body portion 74 of the second latch bracket 70 includes a slot 76 disposed therethrough, which is a curved slot or "banana slot" similar to slot 58 described above in connection with the first latch bracket 54. A latch member 80 is pivotally coupled to the second latch bracket 70 and includes a body portion 82 having an engagement notch 84 and a handle portion 86. Thus, the latch member 80 is a reciprocal latch member to latch member 60 described above in reference to the first latch bracket 54. The latch member 80 is pivotally coupled to the body portion 74 of the second latch bracket 70 at attachment location 79. The latch member 80 is configured to be engaged by a user at the handle portion 86 for rotational movement between the latched position L and the unlatched position UL along the path as indicated by arrow D for moving the headrest member 34 to the folded position F as shown in FIG. 3. The interaction between the first and second latch brackets 54, 70 for moving the headrest member 34 to the folded position F is further described below with reference to FIGS. 4B-4D.

Figure 4B:
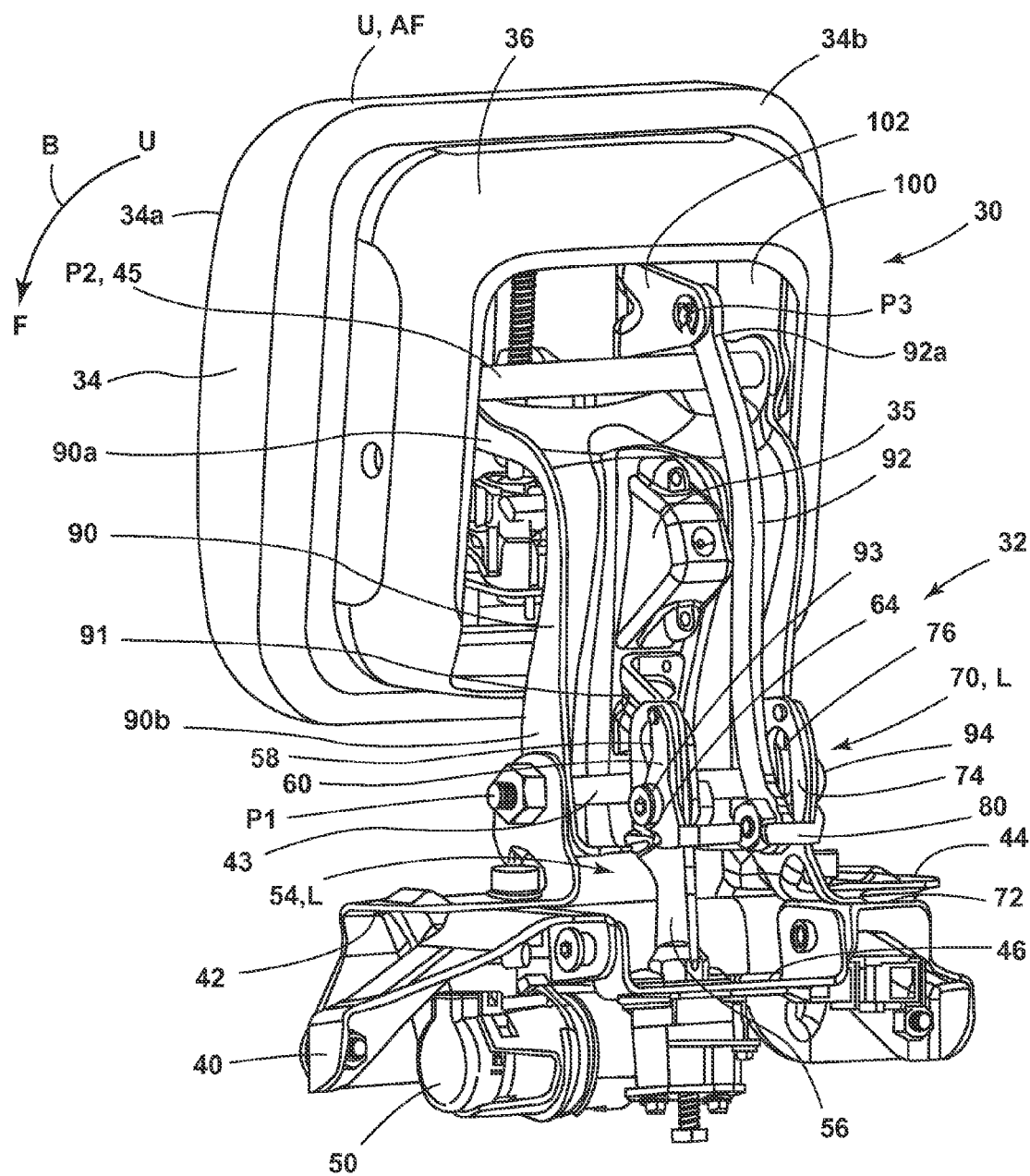
FIG. 4B is a rear perspective view of a headrest assembly having a trim piece removed, wherein the headrest assembly is in a full upright position.
Figure 4C:
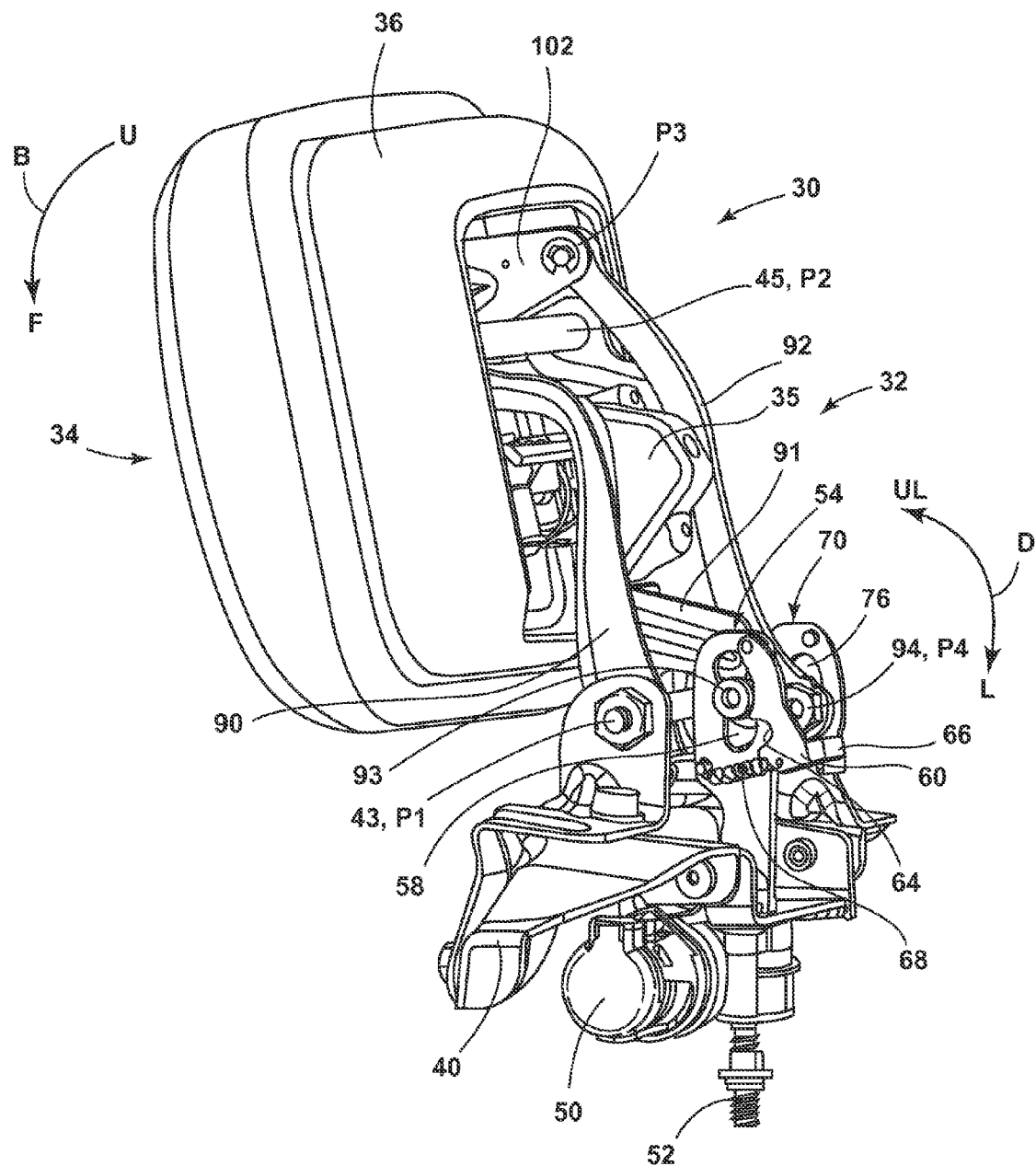
FIG. 4C is a rear perspective view of the headrest assembly of FIG. 4B in a partially folded position.
Figure 4D:
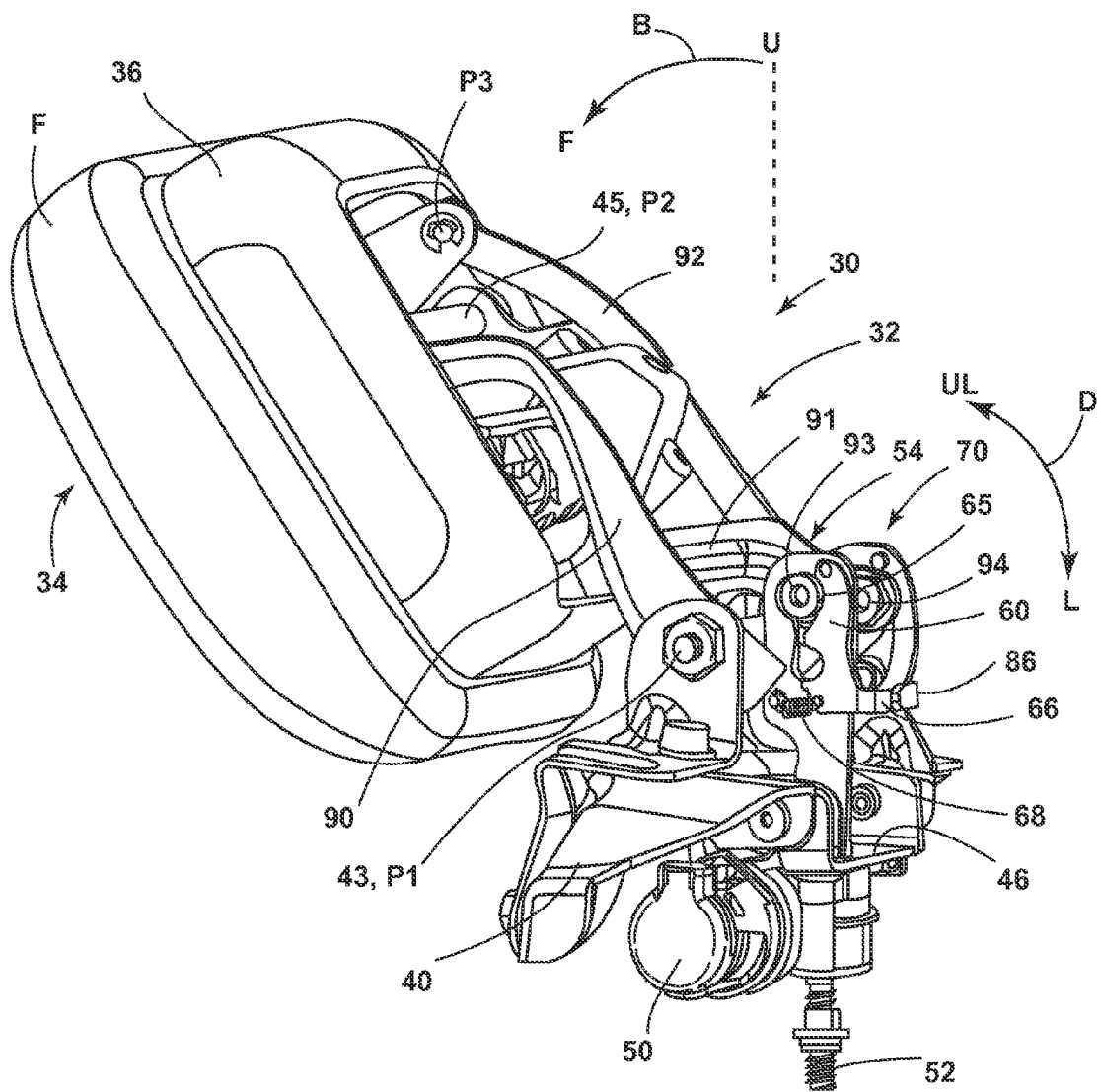
FIG. 4D is a rear perspective view of the headrest assembly of FIG. 4B in a fully folded position.

Referring now to FIGS. 4B-4D, the folding movement of the headrest assembly 30 is shown. Referring specifically to FIG. 4B, the headrest assembly 30 is shown with the headrest member 34 in the upright position U. The headrest member 34 generally includes a front portion 34a and a rear portion 34b having a cushion material disposed therebetween as further described below. The support assembly 32 generally includes first and second linkages 90, 92 which are pivotally coupled to the cross member 40 and headrest member 34 at opposite ends thereof. Specifically, the first linkage 90 includes an upper end 90a and a lower end 90b which are coupled to the headrest member 34 and the cross member 40, respectively. As described in more detail below, the first linkage 90 is coupled to the cross member 40 at the lower end 90b via a pivot bar 43, and is further coupled to the headrest member 34 at the upper end 90a via a pivot bar 45 that is coupled to a headrest bracket 100 of the headrest member 34. Pivot bars 43, 45, respectively, define fixed pivot locations P1, P2. The first linkage 90 further includes a body portion 90c from which a support arm 91 outwardly and downwardly extends. The support arm 91 is latchingly engaged with first latch bracket 54 via first fastener 93 disposed through slot 58 of the first latch bracket 54. The first fastener 93 is retained in place by latch member 60 at engagement notch 64 when the latch member 60 of the first latch bracket 54 is in the latched position L. A trim attachment mount 35 is also disposed on the body portion 90c for coupling trim piece 38 (FIG. 3) to the support assembly 32.

With regard to the second linkage 92 shown in FIG. 4B, an upper end 92a of the second linkage 92 is pivotally coupled to the headrest bracket 100 at connector bracket 102, thereby defining pivot location P3. The second linkage 92 is further coupled to second latch bracket 70 at a lower end 92b. The second linkage 92 is latchingly engaged with second latch bracket 70 via second fastener 94 disposed through slot 76 and retained in engagement notch 84 by latch member 80 while the latch member 80 of the second latch bracket 70 is in the latched position L. As noted above and shown in FIG. 4B, the headrest assembly 30 is configured to allow the headrest member 34 to move from the upright position U to a folded position F along a path as indicated by arrow B. This folding action is made possible by moving the latch members 60, 80 of the first and second latch brackets 54, 70 from the latched position L, shown in FIG. 4B, to the unlatched position UL shown in FIG. 4C, and further described below.

Referring now to FIG. 4C, the headrest assembly 30 is shown with the headrest member 34 being moved towards the folded position F along the path indicated by arrow B. In order to move the headrest member 34 towards the folded position F from the upright position U (FIG. 4B), the first and second latch brackets 54, 70 must be unlatched. A user unlatches the first and second latch brackets 54, 70 by engaging the handle portion 66 of latch member 60 and handle portion 86 of latch member 80 and moving the latch members 60, 80 towards the unlatched position UL along a path as indicated by arrow D. As shown in FIG. 4C, with specific reference to first latch bracket 54, the latch member 60 has been moved towards the unlatched position UL, such that first fastener 93 is no longer retained in engagement notch 64 of latch member 60, and has further moved upward along a length of slot 58 of first latch bracket 54. Second latch bracket 70 functions in a similar manner to release second fastener 94 for movement along slot 76. In the unlatched position UL, the first and second latch brackets 54, 70 allow for the headrest member 34 to move towards the folded position F, as shown in FIG. 4D. It is contemplated that the headrest member 34 may include a sufficient weight to gravitationally move towards the folded position F when the first and second latch brackets 54, 70 are unlatched. Unlatching the headrest assembly 30 causes rotation about pivot location P1, where, as described above, first linkage 90 couples to cross member 40 at pivot bar 43. As further shown in FIG. 4C and with specific reference to first latch bracket 54, the biasing mechanism 68 is in the form of a spring coupled to and disposed between the first latch bracket 54 and the latch member 60, which will bias the latch member 60 towards the latched position L in assembly.

Referring now to FIG. 4D, the headrest assembly 30 is shown in the fully folded position F relative to the cross member 40. As noted above, the cross member 40 is generally enclosed in a seatback, such as seatback 16 shown above in FIG. 3. Thus, a user can unlatch the headrest assembly 30 by accessing the first and second latch brackets 54, 70 from within the seatback 16. Thus, the first and second latch brackets 54, 70 are not generally accessible to a user in common usage, but can be accessed for folding the headrest assembly 30 by a manufacturer for shipping, storage, or for installation in a vehicle interior, such that headrest assembly 30 does not have to be removed from the vehicle seat 10 (FIG. 1) to accommodate confined door openings. As further shown in FIG. 4D, and with specific reference to first latch bracket 54, the biasing mechanism 68 has pulled the latch member 60 towards the latched position L. The latch member 60 includes a ramped portion 65 which is configured to allow a user to move the headrest assembly 30 to the full upright position U by simply pushing the headrest member 34 along the path indicated by arrow B. Latch member 80 of the second latch bracket 70 is also configured in a similar manner, such that a user need not engage either latch bracket when moving the headrest member 34 towards the upright position U.

Figure 5:
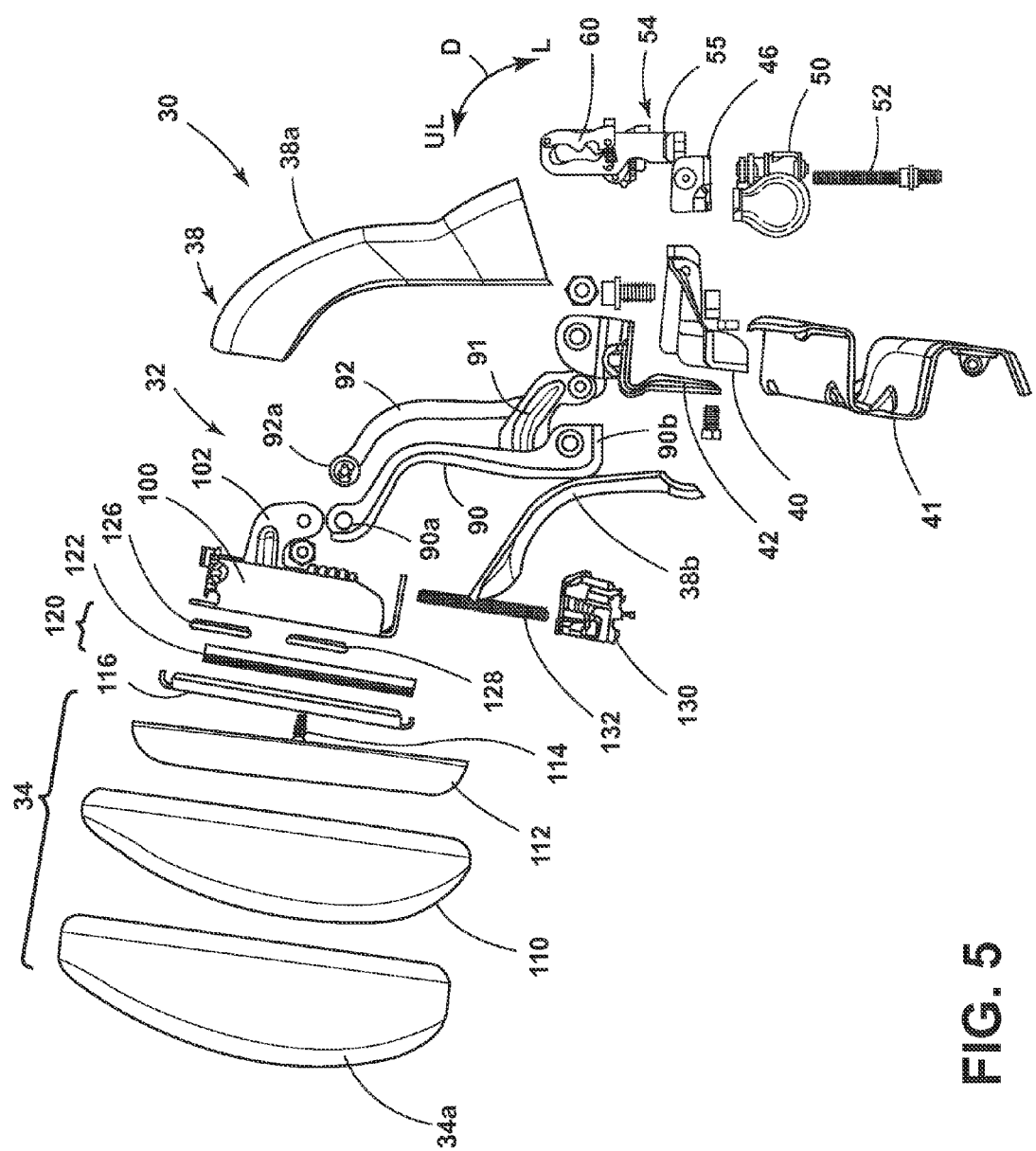
FIG. 5 is an exploded side elevational view of the headrest assembly of FIG. 4B.

Referring now to FIG. 5, the headrest member 34 includes a cushion insert 110 that further receives a rigid backing panel 112. The cushion insert 110 be made of a foam material, a resilient woven material, or other flexible cushion materials and combinations thereof as generally understood by one having ordinary skill in the art. It is contemplated that the cushion insert 110 may be an integrated part, as shown, or may be comprised of multiple parts have varying densities. The rigid backing panel 112 is coupled to a support plate 116 by a fastener 114. The support plate 116 is configured to house a track assembly 120 having a pair of parallel tracks 122, 124, as best shown in FIG. 6. The pair of parallel tracks 122, 124 slidably couple with upper and lower sliding elements 126, 128 of the track assembly 120 that are fixedly coupled with headrest bracket 100. A second actuator 130 includes a drive shaft 132 that is coupled to the headrest member 34 for vertical adjustment of the headrest member 34 in a direction indicated by arrow V, as further described below with reference to FIGS. 7A and 7B. The trim piece 38 is shown in FIG. 5 as having an upper housing 38a and a lower housing 38b which encase the support assembly 32 in assembly. As further shown in FIG. 5, a support member 41 is shown exploded away from cross member 40 which is coupled to cross member 40 in assembly in the seatback 16 (FIG. 3) for added strength and support.

Referring now to the embodiment shown in FIG. 6, four separate sliding elements 126a, 126b, 128a and 128b are included having a generally T-shaped cross section. However, it is contemplated that more, fewer, and alternatively shaped sliding elements may be included in additional embodiments of the track assembly 120. Furthermore, the track assembly 120 may be alternatively configured with the tracks fixedly coupled with the headrest member 34 and the sliding elements fixedly coupled with the backing panel 112 of the cushion 110. In addition, the track assembly 120 may otherwise be integrated in additional embodiments with portions of the cushion 110, such as the backing panel 112, or portions of the headrest member 34.

Figure 7A:
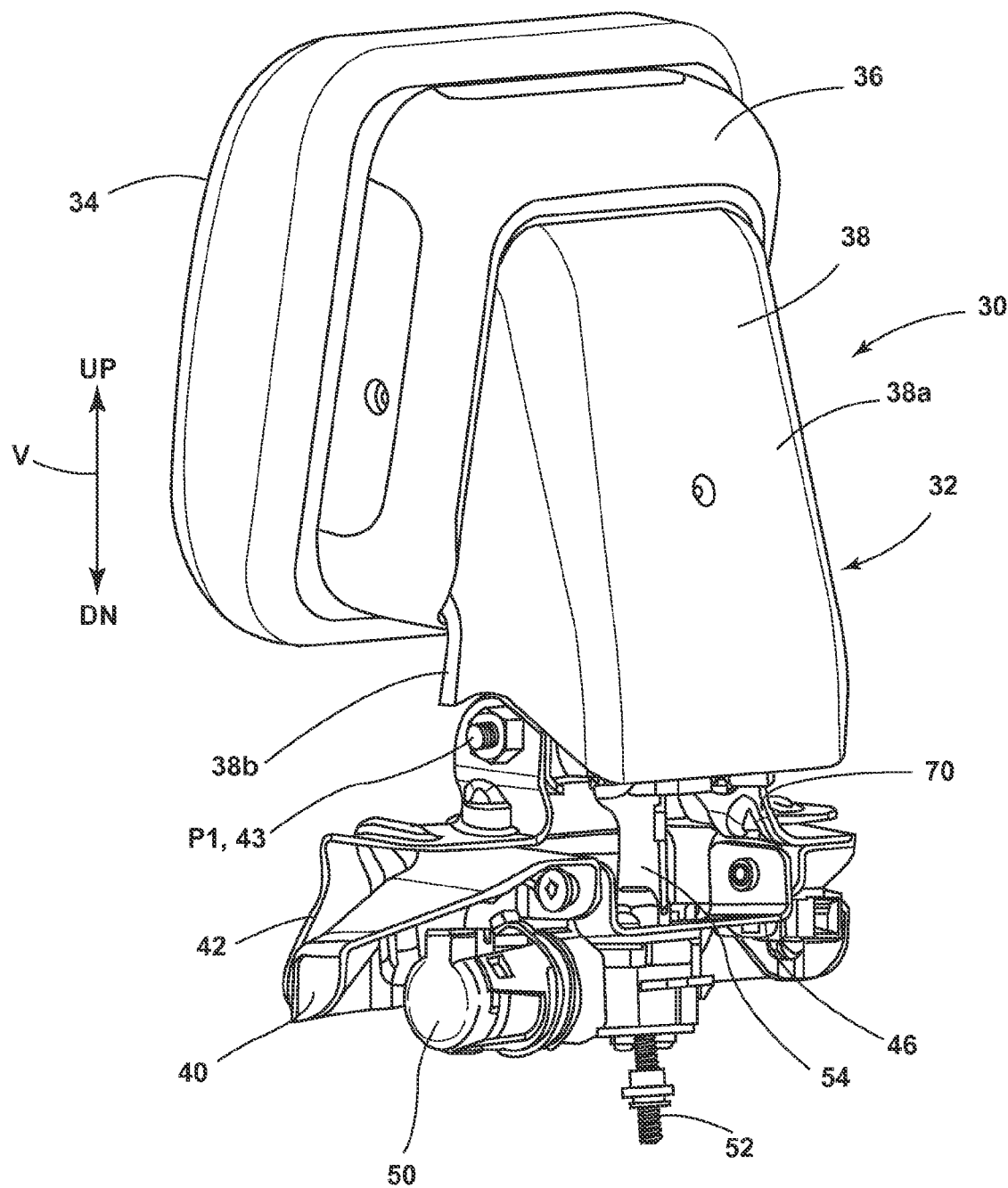
FIG. 7A is a rear perspective view of the headrest assembly of FIG. 5 assembled with the headrest member in a fully down position.
Figure 7B:
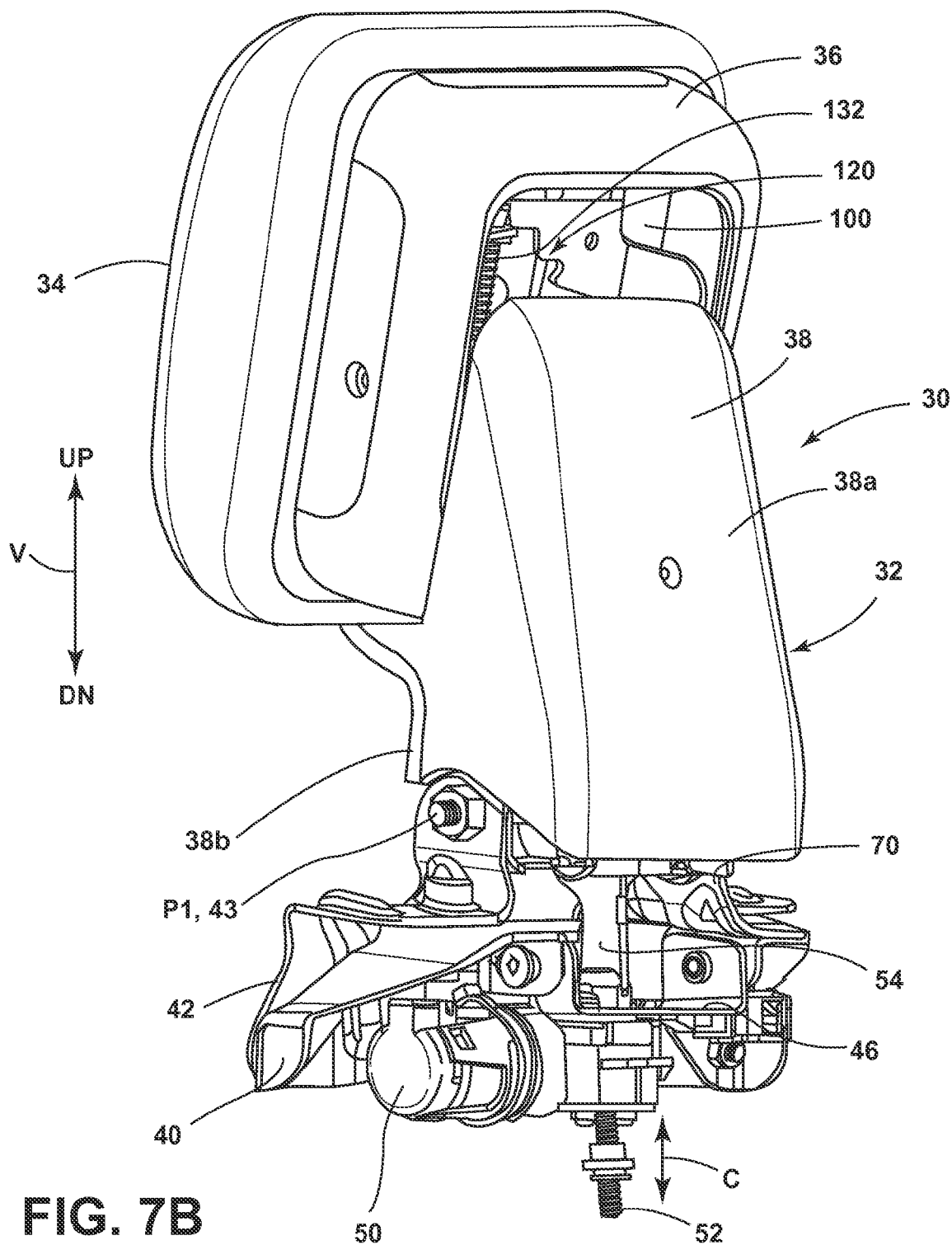
FIG. 7B is a rear perspective view of the headrest assembly of FIG. 7A with the headrest member in a full up position.

Referring now to FIG. 7A, the headrest assembly 30 is shown with the headrest member 34 in a fully down position DN. As noted above, the second actuator 130 (FIG. 5) is configured to drive the headrest member 34 to a full upright position UP as shown in FIG. 7B along a path indicated by arrow V. As further shown in FIGS. 7A and 7B, back casing 36 conceals the track assembly 120 and second actuator 130, while the trim piece 38 encloses the support assembly 32 in assembly. With specific reference to FIG. 7B, the headrest member 34 is in the full upright position UP as driven by the second actuator 130. It is contemplated that a covering may be used to conceal any gaps formed between the trim piece 38 and back casing 36 as the headrest member 34 moves vertically along the path indicated by arrow V.

Figure 8A:
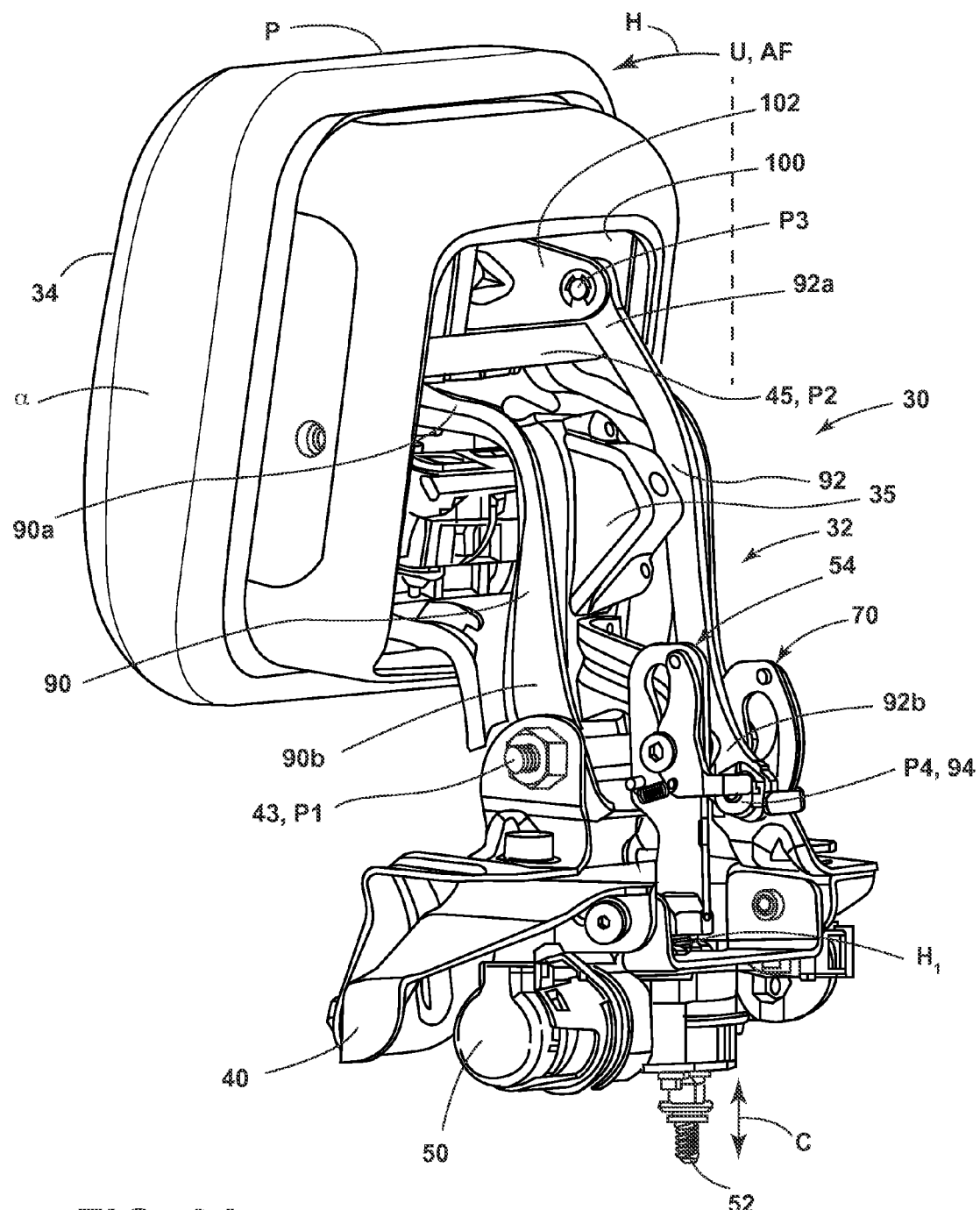
FIG. 8A is a rear perspective view of the headrest assembly of FIG. 7A with the cover removed and the headrest member in an aft position.
Figure 8B:
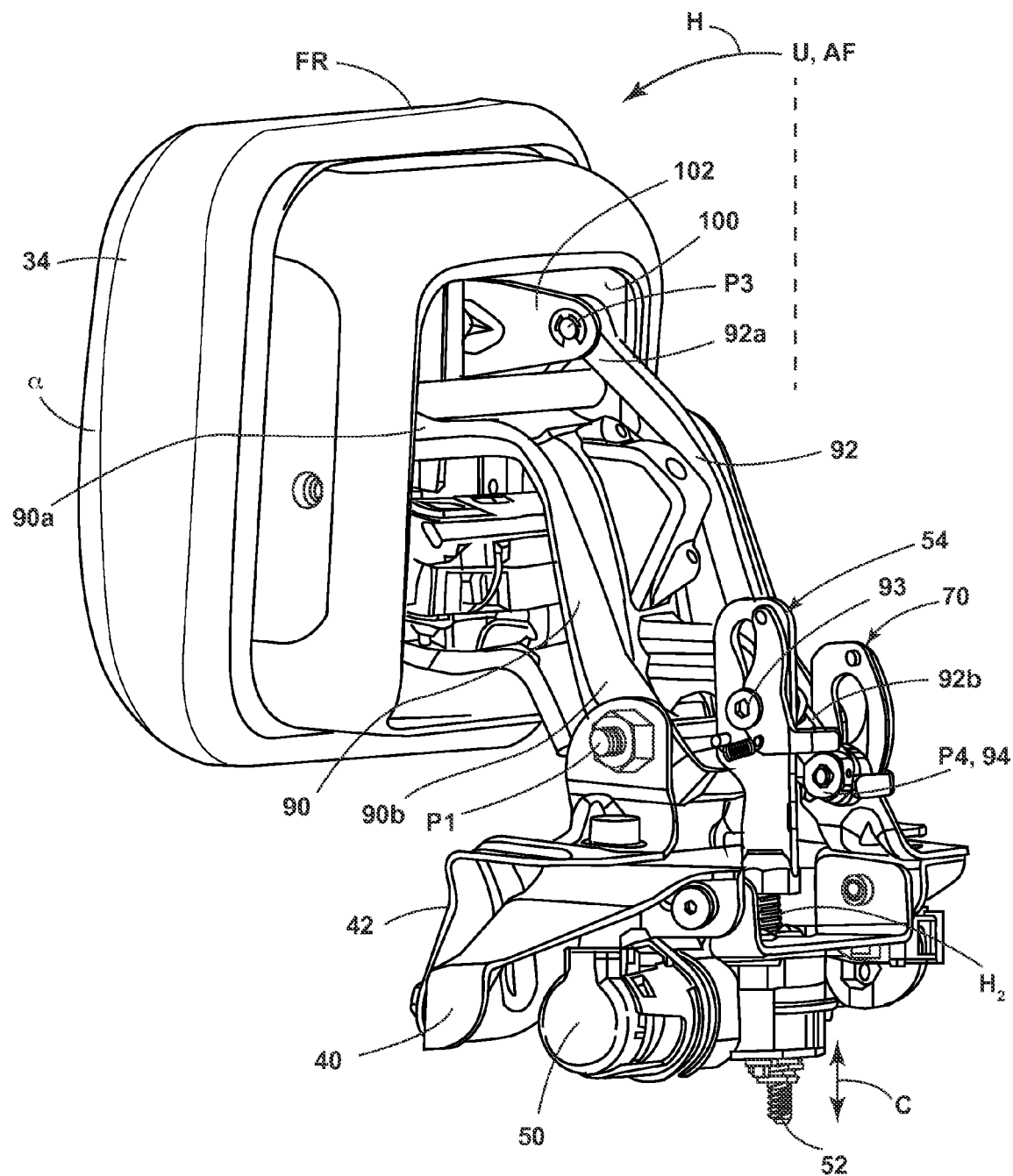
FIG. 8B is a rear perspective view of the headrest assembly of FIG. 8A with the headrest member in a fore position.

Referring now to FIGS. 8A and 8B, the pivotal connection between the lower end 90b of the first linkage 90 and the cross member 40 defines a first lateral axis at pivot location P1. Further, the pivotal connection between the upper end 90a of the first linkage 90 and the headrest bracket 100 defines a second lateral axis at pivot location P2. Similarly, the second linkage 92 has a pivotal connection to the connector bracket 102 of the headrest bracket 100 at an upper end 92a, which defines a third lateral axis at pivot location P3. When the headrest assembly 30 is in the latched position L, the lower end 92b of the second linkage 92 defines a fourth lateral axis P4 at the pivotal connection of the lower end 92b and the second latch bracket 70 at second fastener 94. With the 4 lateral axes P1-P4, the support assembly 32 of the headrest assembly 30 comprises a four-bar linkage that pivots at the fixed pivot points P1-P4 to move the headrest member 34 between fore and aft positions FR, AF along a path indicated by arrow H. This movement is substantially horizontal to the user, while the headrest member 34 actually rotates forward and downward from the aft position AF to the fore position FR (as shown in FIG. 8B). Thus, the support assembly 32 defines a four bar linkage, wherein the first linkage 90 defines a primary linkage, and the second linkage 92 defines a secondary linkage. While both coupled to the headrest bracket 100, lateral axes P2 and P3 are offset from one another, wherein third lateral axis P3 is disposed above and rearward from the second lateral axis P2. Similarly, while both essentially coupled to the cross member 40, lateral axes P1 and P4 are offset from one another, wherein fourth lateral axis P4 is disposed below and rearward from the first lateral axis P1. This configuration provides for a consistent angle α of headrest member 34 as headrest member 34 moves between fore and aft positions FR, AF along the path indicated by arrow H.

Demonstrating the relative movement of the headrest member 34 between fore and aft positions FR, AF along the path indicated by arrow H, we must first look to FIG. 4B, wherein the headrest member 34 is in both the full upright position U and the aft position AF. Referring now to FIG. 8A, the headrest member 34 has moved forward towards the fore position FR to a partial forward position P that is approximately rotated 15° towards the fore position FR. As noted above, the headrest member 34 is driven along path H between the fore and aft positions FR, AF by first actuator 50 which is connected to the first latch bracket 54 via the drive shaft 52 at connection location 55. As shown in FIG. 8A, as compared to FIG. 4B, the drive shaft 52, as powered by the first actuator 50, has moved upward to a height $H_1$, and thereby driven the first latch bracket 54 upwards along the path C, described above, such that the headrest member 34 has rotated forward to the partial forward position P. Thus, when the headrest member 34 is move towards the fore position FR, the first latch bracket 54 will be vertically offset relative to the second latch bracket 70 as shown in FIGS. 8A and 8B.

Referring now to FIG. 8B, relative to FIG. 8A, the headrest the drive shaft 52, as powered by the first actuator 50, has moved upward to a height $H_2$, and thereby driven the first latch bracket 54 further upwards along the path C, such that the headrest member 34 has rotated further forward to the fully fore position FR which is approximately rotated 30° from the aft position AF. While the headrest member 34 is moved along the path indicated by arrow H, the angle α of the headrest member 34 is consistent between FIGS. 4B, 8A, and 8B. Thus, as adjusted vertically and horizontally, the angle α of the headrest member 34 is maintained by cooperation between the 4 lateral axes P1-P4 of the support assembly 32.

As noted above, the headrest assembly 30 is adjustable in many different directions to allow for comfort customization by the user. The headrest assembly 30 is adjustable in that the headrest member 34 can move between fore and aft positions FR, AF (FIGS. 8B, 4A) along the path indicated by arrow H, and can also move between the full upright position UP, as shown in FIG. 7B, to the full down position DN, shown in FIG. 7A, along the path indicated by arrow V. The first and second actuators 50, 130 drive the horizontal movement and vertical movement as described above. The horizontal movement and vertical movement of the headrest member 34 is generally controlled by the user through remote electrical connections known in the art. As noted above, with reference to FIGS. 4B-4D, the headrest member 34 of the present invention can also move from the upright position U, as shown in FIG. 4B, to the folded position F, as shown in FIG. 4D, along the path indicated by arrow B. This adjustment between upright and folded positions U, F is generally performed by the manufacturer for storage, shipping and installation of the vehicle seat 10 (FIG. 1) and headrest assembly 30 in a vehicle. As noted above, the folding of the headrest assembly 30 allows the manufacture to store, ship and install the vehicle seat 10 in confined spaces, without have to separate the headrest assembly 30 from the vehicle seat 10. Thus, a secure connection between the headrest assembly 30 and the vehicle seat 10 can be achieved and maintained from the assembly location to the installation location.

With specific regard to the movement of the headrest member 34, it is contemplated that relative travel along the path V between full up position UP, as shown in FIG. 7B, to the full down position DN, as shown in FIG. 7A, may be about 55 mm in the vertical direction V. It is further contemplated that relative travel of the headrest member 34 along the path H between the aft position AF, as shown in FIG. 4B, to the fore position FR, as shown in FIG. 8B, may be about 80 mm in the horizontal direction H. It is further contemplated that relative travel of the headrest member 34 along the path B between upright position U, as shown in FIG. 4B, to the folded position F, as shown in FIG. 4D, may be about 91 mm in a generally horizontal direction, and about 95 mm in a generally vertical direction. These travel dimensions are exemplary only, and are not intended to limit the scope of the present invention in any way. One of ordinary skill in the art will appreciate that longer and shorter lengths of travel can be incorporated into the movement of the headrest member 34 of the present invention without departing form the spirit of the invention.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle headrest assembly comprising:
   a headrest member operably coupled to a seatback between upright and folded positions;
   a support assembly including first and second linkages pivotally coupled to the headrest member and the seatback at opposite ends thereof; and
   first and second latch brackets coupled to the first and second linkages respectively and operable between latched and unlatched positions for moving the headrest member to the folded position from the upright position, wherein the first latch bracket is coupled to a cross member and a first actuator within the seatback, and further wherein the first actuator drives the first latch bracket vertically to move the headrest member between fore and aft positions.

2. The vehicle headrest assembly of claim 1, wherein the first and second latch brackets each include a body portion having a slot therethrough and a latch member pivotally coupled to the body portion between latched and unlatched positions.

3. The vehicle headrest assembly of claim 2, wherein each latch member includes a ramped portion and an engagement notch.

4. The vehicle headrest assembly of claim 3, wherein the first linkage includes a support arm extending outwardly therefrom and coupled to the slot of the first latch bracket by a first fastener.

5. The vehicle headrest assembly of claim 4, wherein the first fastener is retained in the engagement notch of the latch member of the first latch bracket when the latch member of the first latch bracket is in the latched position.

6. The vehicle headrest assembly of claim 5, wherein the second linkage is coupled to the slot of the second latch bracket by a second fastener, and further wherein the second fastener is retained in the engagement notch of the latch member of the second latch bracket when the latch member of the second latch bracket is in the latched position.

7. The vehicle headrest assembly of claim 6, the latch members of the first and second latch brackets further include handle portions for engagement by a user to move the latch members to the unlatched position from the latched position when folding the headrest member.

8. The vehicle headrest assembly of claim 7, the latch members of the first and second latch brackets further include biasing mechanisms biasing the latch members towards the latched position.

9. A vehicle headrest assembly comprising:
   a headrest member having a headrest bracket;
   a seatback having a cross member with a first actuator disposed thereon;
   a first linkage pivotally coupled to the cross member at a lower end and pivotally coupled to the headrest bracket at an upper end, the first linkage having a support arm extending outwardly therefrom;
   a first latch bracket coupled to the first actuator, and further coupled to the support arm;
   a second linkage coupled to a second latch bracket at a lower end, and pivotally coupled to the headrest bracket at an upper end, wherein the second latch bracket is disposed on the cross member, and further wherein the first and second linkages define a support assembly moveable between fore and aft positions as powered by the first actuator; and
   wherein the first and second latch brackets are operable between latched and unlatched positions, and further wherein the headrest member is moveable to a folded position when the first and second latch brackets are in the unlatched position.

10. The vehicle headrest assembly of claim 9, including:
    a track assembly operably coupled to the headrest member; and
    a second actuator coupled to the headrest bracket, wherein the headrest member is vertically adjustable as driven by the second actuator.

11. The vehicle headrest assembly of claim 10, wherein the first and second latch brackets each include a body portion having a curved slot therethrough and a latch member pivotally coupled to the body portion between latched and unlatched positions.

12. The vehicle headrest assembly of claim 11, wherein each latch member includes a ramped portion and an engagement notch.

13. The vehicle headrest assembly of claim 12, wherein the support arm is coupled to the curved slot of the first latch bracket by a first fastener.

14. The vehicle headrest assembly of claim 13, wherein the first fastener is retained in the engagement notch of the latch member of the first latch bracket when the latch member of the first latch bracket is in the latched position.

15. The vehicle headrest assembly of claim 14, wherein the second linkage is coupled to the curved slot of the second latch bracket by a second fastener, and further wherein the second fastener is retained in the engagement notch of the latch member of the second latch bracket when the latch member of the second latch bracket is in the latched position.

16. A vehicle headrest assembly comprising:
    a support assembly including first and second linkages pivotally coupled to a headrest member between fore and aft positions, the headrest member being vertically adjustable;
    first and second latch brackets coupled to the first and second linkages respectively, the latch brackets being operable between latched and unlatched positions, wherein the headrest member is moveable to a folded position when the latch brackets are in the unlatched position;
    a first actuator configured to drive the headrest member between the fore and aft positions; and a second actuator for adjusting a vertical position of the headrest member.

17. The vehicle headrest assembly of claim 16, wherein the first linkage includes:
- a lower end pivotally coupled to a cross member disposed within a seatback to define a first lateral axis,
- an upper end pivotally coupled to the headrest member to define a second lateral axis, and wherein the second linkage includes:
- an upper end pivotally coupled to the headrest member to define a third lateral axis,
- a lower end pivotally coupled to the second latch bracket to define a fourth lateral axis, wherein the each of the lateral axes cooperate to maintain an angle of the headrest member as the support assembly moves between fore and aft positions.

* * * * *